dkfjd

2,956,029

REGENERATION OF CUPROUS CHLORIDE CATALYSTS EMPLOYED IN THE PRODUCTION OF ACRYLONITRILE

Thomas D. Higgins, Jr., David W. McDonald, and Martin M. McLane, Texas City, Tex., assignors to Monsanto Chemical Company, St. Louis, Mo., a corporation of Delaware No Drawing. Filed July 22, 1957, Ser. No. 673,176

8 Claims. (Cl. 252—413)

The present invention relates to an improvement in the production of acrylonitrile. More particularly, it pertains to a method for regenerating or reactivating the copper chloride catalysts employed for the production of acrylonitrile from acetylene and hydrogen cyanide.

It is well known that acrylonitrile can be produced by reacting acetylene with hydrogen cyanide in the presence of an aqueous cuprous salt catalyst. The catalyst most commonly employed is the so-called Nieuwland catalyst which comprises essentially an aqueous solution of cuprous chloride, potassium and sodium chlorides, and hydrochloric acid. Instead of the alkali metal salts, ammonium chloride may be used to solubilize the cuprous chloride. Also the acidity of the catalyst may be attained by substituting other strong acids such as sulfuric acid, hydrobromic acid, and phosphoric acid for the hydrochloric acid mentioned. In the continuous operation of the process, the activity of the catalyst gradually diminishes until it becomes necessary to renew the total catalyst supply in order to maintain an economic level of production of acrylonitrile. The system is a complex one and there are a number of factors which contribute to the loss of activity or poisoning of the catalyst. By-products are formed from side reactions of impurities in the acetylene used, such as diacetylene, allene, allylene, etc., as well as from the interactions between unsaturated compounds, such as vinylacetylene, divinylacetylene, and cyanobutadiene, which arise in the reaction. Polymeric materials such as polyacrylic acids and polyamides also are thought to occur as impurities in the catalyst solution. Most of these by-products are carbon-containing compounds which appear as viscous tarry or resinous materials and interfere with operation of the reactor as well as reduce catalyst efficiency. Ammonium chloride is continuously being formed, too, from the reaction of the ammonia arising from hydrolysis of acrylonitrile with hydrochloric acid and as it accumulates the activity of the catalyst gradually decreases.

Many methods have been proposed for keeping the catalyst active. Some of these involve means for internal treatment of the catalyst by control of reaction conditions, such as adjusting the acetylene-to-HCN ratio, controlling the pH of the catalyst, etc. In others, it has been proposed to withdraw catalyst periodically and add copper chloride to the remaining solution, or to pass the withdrawn catalyst through an adsorption system for removal of objectionable impurities and thereafter return it to the system. Another method calls for addition of modifying substances to the reactor to remove tarry impurities. Still another technique comprises dilution of the catalyst with water to precipitate cuprous chloride, filtration to recover the cuprous chloride and washing with acetonitrile to free the recovered cuprous chloride of soluble carbon. None of these methods is completely satisfactory, however. Internal treatment of the catalyst cannot be employed without disrupting some other phase of the overall mechanism of the reaction. The other methods mentioned are either only temporary expedients eventually resulting in high copper loss or recovery of copper values at a prohibitive cost, or they require tedious and expensive operations to produce the regenerated material, or the regenerated catalyst has only a limited activity in comparison to fresh catalyst.

It is an object of this invention, therefore, to provide an improved process for the regeneration of the copper chloride catalyst used in the production of acrylonitrile from acetylene and HCN which is practical, economical, and which affords a minimum copper loss while effecting maximum removal of organic or tarry impurities as well as ammonium chloride.

According to the invention, inactive or spent catalyst is digested with a solution of an alkali metal or an alkaline earth metal hydroxide to precipitate the copper present therein as cuprous hydroxide or hydrated cuprous oxide, to solubilize the carbon-containing impurities it contains, and to convert the ammonium chloride present to ammonium hydroxide. The precipitated material, hereafter called cuprous hydroxide, is then separated from the liquid in the resulting slurry by any suitable method such as centrifuging, for example. The precipitate is treated with hydrochloric acid to convert the cuprous hydroxide to cuprous chloride and a sufficient amount of a solubilizing chloride is added to maintain the desired quantity of solubilizing chloride or the required ratios among the solubilizing chlorides in the catalyst. The resulting copper chloride slurry may then be used as such by adding it in the calculated amount to the catalyst solution in an operating reactor where an amount of water is automatically removed in the operation to effect solution. Alternatively, sufficient water may be evaporated from the slurry to convert it to a solution and the resulting solution may then be used alone or in conjunction with other fresh or used catalyst.

The invention is illustrated in the following examples which, however, are not to be construed as limiting it in any manner except as it is limited in the attached claims.

EXAMPLE I

A jacketed reaction vessel equipped with an agitator was purged with natural gas and approximately 9500 lb. of a 25% solution of sodium hydroxide was charged to it. Hot condensate was then introduced into the reactor in an amount equal to approximately 3000 lb. while the contents of the vessel were agitated. A charge of about 6000 lb. of a spent catalyst solution which had been used for some time in a commercial unit for the production of acrylonitrile from acetylene and HCN was then added to the hydroxide solution over a 10- to 15-minute period with continuous agitation being maintained within the reactor. The temperature was adjusted to about 70° C. and the reaction mixture was maintained at this temperature for approximately two hours while it was stirred continuously. An inert atmosphere was maintained in the vessel during charging of the caustic, water, and catalyst as well as during the reaction period by means of a continuous purge of the vessel with natural gas.

At the end of the reaction period, the mixture was steadily fed to a centrifuge where the solids (copper hydroxide) were separated from the liquid. The solids having the consistency of a very thick mud were discharged into a mixing vessel containing 800 lb. of potassium chloride slurried in approximately 1800 lb. of water. The liquor was pumped to waste disposal facilities. Mixing of the copper hydroxide and KCl was effected by agitation within the vessel and by circulation of the mixture from the bottom of the vessel via a pump and connecting line back into the top of the vessel. Hydrochloric acid (30%) was injected into the circulating line at a T connection to convert the copper hydroxide to copper chloride. Neutralization required about 35–40 minutes. The course of the neutralization was followed by measurement of the pH of samples withdrawn periodically. The pH gradually dropped from an initial reading of 11–12 to 4.8 and then decreased rapidly to about 1.5. After neutralization was complete as indicated by the pH, the resulting "regenerated catalyst" slurry was pumped to a reactor for use in the preparation of acrylonitrile.

Comparative analyses of samples of the spent catalyst and the regenerated catalyst after it had been converted into a solution by the evaporation of a sufficient amount of water are presented in Table I. Listed alongside of these is a representative catalyst recipe and the analysis of an "active" catalyst solution, i.e., one which has been in use a comparatively short time and with which acrylonitrile can be produced at an economic rate.

Table I

|  | Spent Catalyst | Regenerated Catalyst | Catalyst Recipe | Active Catalyst |
|---|---|---|---|---|
| Total Carbon by Combustion, Wt. percent | 7.35 | 0.99 | --------- | 1.34 |
| CN$^-$, Wt. percent | 1.21 | 0.93 | --------- | 0.93 |
| Net Carbon (Total minus Cyanide C) | 6.81 | 0.58 | --------- | 0.91 |
| Soluble Tar,[1] percent | 6.37 | 0.49 | --------- | 1.16 |
| NH$_4$Cl, percent | 10.98 | 3.04 | --------- | 2.30 |
| Total Copper as CuCl, percent | 34.30 | 40.92 | 40.0 | 41.0 |
| Total Chlorides, percent | 26.52 | 28.57 | --------- | 29.4 |
| Density | 1.6105 | 1.762 | --------- | 1.780 |
| KCl, percent | --------- | 14.3 | 19.0 | 15.90 |
| NaCl, percent | --------- | 7.7 | 7.0 | 5.85 |
| Water, percent | 26.56 | 29.89 | 33.0 | 28.41 |
| Total Acidity, as percent HCl | 2.43 | 0.38 | 1.0 | 0.65 |
| R-Ratio (Moles CuCl/Moles XCl where X = a metal, H, or NH$_4$) | 0.867 | 1.052 | 1.0 | 0.999 |
| Net Carbon/copper Wt. Ratio | 0.199 | 0.0142 | --------- | 0.0222 |
| NH$_4$Cl/Cu Wt. Ratio | 0.320 | 0.0743 | --------- | 0.0561 |

[1] Organic material extracted from catalyst solution with a 50-50 benzene-dioxane solution.

These data demonstrate that the treatment given the spent catalyst resulted in the removal of 92.9% by wt. of carbon and 76.8% of the NH$_4$Cl. Only 2.1% of the total copper present in the spent catalyst was lost as dissolved copper compounds in the waste stream. The efficiency or activity of the copper chloride catalyst has been shown to be directly related to the net carbon/copper ratio, catalysts having a lower carbon-to-copper ratio being the more active. Thus, it will be seen that the activity of the spent catalyst had been increased considerably by virtue of the regeneration treatment described above.

EXAMPLE II

The regeneration of a sample of used catalyst from an acrylonitrile-producing unit was carried out on a laboratory scale. Approximately 2130 ml. of an aqueous 25% sodium hydroxide solution was charged to a 5-liter, round-bottomed flask fitted with a stirrer, a condenser head, a thermometer, and gas inlet and outlet means for maintaining a continuous purge of the flask with inert gas. To the caustic there was added 1400 ml. of the spent copper-containing catalyst. The mixture was heated to 80° C. and maintained at that temperature while it was continuously stirred for about 1 hr. The reaction slurry was then diluted with 1 l. of 1% sodium hydroxide and fed into a basket centrifuge fitted with a cotton duck filter cloth. A small portion of the cake obtained was analyzed and found to contain 2.6% by wt. of carbon.

The dry filter cake was reslurried with approximately 2.5 liters of 1% NaOH, heated to 60° C. with stirring, and then filtered on filter paper in a Büchner funnel. Analysis of a small portion of this filter cake indicated that it had a carbon content of 2.1%. The moist cake obtained was transferred to a 3-liter flask and 570 ml. of 36% HCl and 300 g. of KCl were added to the flask. The mixture was thoroughly agitated to effect conversion of the copper hydroxide to copper chloride and thereafter water was evaporated from it until the density of the resulting regenerated catalyst solution was 1.75. All these operations were carried out under an atmosphere of inert gas. A 150-ml. sample of the solution was then analyzed. Results of this analysis together with those obtained from a similar analysis of the spent catalyst before it was treated are recorded in Table II.

Table II

|  | Spent Catalyst | Regenerated Catalyst |
|---|---|---|
| Total Carbon by Combustion, Wt. Percent | 7.50 | 1.13 |
| CN$^-$, Wt. Percent | 1.21 | 0.43 |
| Net Carbon (Total minus Cyanide C), Percent | 6.94 | 0.93 |
| Soluble Tar, Percent | 7.59 | 0.89 |
| NH$_4$Cl, Percent | 9.83 | 1.31 |
| Total Copper as CuCl, Percent | 37.2 | 38.4 |
| Total Chlorides, Percent | 26.4 | 28.71 |
| Density | 1.581 | 1.75 |
| KCl, Percent | 9.83 | 16.6 |
| NaCl, Percent | 5.52 | 7.7 |
| Water, Percent | 27.8 | 30.5 |
| Total Acidity, as % HCl | 2.5 | 0.87 |

The activity of the spent catalyst and the regenerated catalyst, respectively, was determined by employing both catalysts in separate runs under identical operating conditions in a laboratory reactor in which acrylonitrile was prepared by the reaction of acetylene and hydrogen cyanide. With the spent catalyst, acrylonitrile was produced at a rate of 6.3 grams per hour per liter of catalyst while with the regenerated catalyst the rate of production of acrylonitrile was 14.7 g./hr./l., an increase in catalyst activity of more than 200% having been effected by the regeneration treatment. Compared with fresh catalyst of the same R-ratio (moles of CuCl/moles of XCl), water content, and composition, the spent catalyst had only 53% of the activity of fresh catalyst while the regenerated catalyst had an activity equivalent to 88% of fresh catalyst.

EXAMPLE III

A 100-ml. sample of spent catalyst was added to a slurry of 48 g. of calcium hydroxide in 270 ml. of water. The mixture was heated for one hour at 80° C. while it was continuously agitated and maintained under an inert atmosphere. The resulting cuprous hydroxide slurry was centrifuged and the liquid decanted therefrom. Both the liquid and the solid material were analyzed for tar and ammonium chloride and results indicated that 63.9% of the original organic tarry materials and 51.4% of the ammonium chloride were removed. Since only 68.3% of the liquid containing the impurities was removed from the copper hydroxide by centrifuging, these results demonstrate that 95.6% of the organic tarry materials and 83.1% of the ammonium chloride were solubilized.

Many variations may be made from the procedure described in the examples without departing from the scope of the invention. In the digestion step, for example, hydroxides other than the sodium hydroxide mentioned in the examples may be used. Any alkali metal hydroxide or alkaline earth metal hydroxide, such as potassium hydroxide, lithium hydroxide, calcium hydroxide, and the like, may be used. The amount of hydroxide required will vary with the composition of the catalyst being treated. In this step the following reactions are thought to occur. Sodium hydroxide is used here merely for illustrative purposes. Any of the suitable hydroxides, of course, react in an analogous manner.

CuCl+NaOH→CuOH+NaCl
NH₄Cl+NaOH→NH₄OH+NaCl
NH₄OH→NH₃+H₂O
HCl+NaOH→HOH+NaCl
HCN+NaOH→NaCN+H₂O
Organic acids+NaOH→Na salts of acids
Tars+NaOH→Na salts of polyacrylic acid
  (Assumed to be polyacrylic acids and polyamides)

Thus, enough hydroxide must be used to provide a sufficient number of moles to bring about the above reactions. This amount is readily determined from an analysis of the spent catalyst solution. In the preferred method of operation, an excess of hydroxide from 10–25 mole percent is employed. In addition, if the catalyst contains tars which are insoluble in the catalyst solution, sufficient hydroxide to solubilize these materials must also be included. The strength of the hydroxide solution should be such that solids content of the slurry obtained is less than 15%. Alternatively, more concentrated solutions of hydroxide may be used and after the reaction is complete, water may be added to the slurry in an amount sufficient to give the mixture the desired solids content. The more dilute the slurry, the more efficient is the process.

The preferred method of operation involves the addition of the spent catalyst to the hydroxide because this prevents the possibility of the copper hydroxide precipitate adhering to and occluding tars as well as obviating adherence of the tars to the vessel walls which creates difficulty in solubilizing them. However, this step can also be accomplished by adding the hydroxide to the spent catalyst or feeding both to the reactor simultaneously.

The digestion step may be carried out at temperatures in the range from 20 to 100° C. Preferred temperatures are those in the range from about 70 to about 90° C. Suitable reaction times vary from 10 min. to 12 hours or more, if desired; preferred reaction times are those in the range from about 1 to about 6 hours.

Large quantities of ammonia are evolved in the digestion step, hence, the system must be vented to prevent pressure build-up. The use of a purge gas in this step is advantageous both in facilitating the removal of ammonia gas and in maintaining an inert atmosphere which prevents oxidation of the copper. Any inert gas may be employed for this purpose. The addition of small amounts of copper powder also prevents oxidation in this step.

Because of the small particle size of the copper hydroxide precipitate, a centrifuge is preferred for efficient separation of the precipitate from the liquor containing the impurities. However, other methods such as filtration, gravity separation, etc., may be employed. During the separation, the temperature of the slurry should be kept above 60° C. to ensure most efficient separation of impurities as soluble materials. If desired, the separated solids may be subjected to one or more additional treatments with sodium hydroxide to ensure the maximum possible removal of impurities. In such reslurrying steps, enough of a dilute caustic solution is added to the recovered solids to effect good contact between the caustic and the solid. The resulting slurry is then stirred thoroughly at a temperature of at least 60° C. and then separated.

The neutralization step or conversion of the copper hydroxide to copper chloride is effected by adding hydrochloric acid of any desired concentration, but preferably about 30%, incrementally to the solids recovered from the centrifuging or other suitable separation technique until the pH of the mixture is in the range from 1–3 which indicates complete neutralization. If desired, anhydrous hydrogen chloride may be employed instead of the acid. To ensure complete conversion and avoid any large excess of HCl, the addition may be followed by pH measurements. The conversion may also be followed by visual observation of the color. The change in pH is marked by a lightening in color of the mixture which becomes quite sharp as neutralization is completely effected. At the end point, the color of the copper hydroxide changes from an orange yellow to white if no potassium chloride is present and to tan if sufficient KCl is present along with the NaCl formed in the neutralization to dissolve a portion of the copper chloride. Thus, only one pH measurement need be made after the color change is observed to confirm that complete neutralization has been effected, or the color change itself may be used alone as a reliable criterion for complete reaction in this step. Considerable heat is evolved during the addition of the acid and the rate of addition must be carefully controlled to avoid any unduly sharp temperature rise. Either heat may be removed from the mixing vessel or sufficient water may be added to maintain a temperature of 85° C. or less.

Some of the solubilizing chloride or chlorides present in the catalyst being treated is carried over with the mother liquor remaining with the copper hydroxide and some is also formed in the conversion of the copper hydroxide to copper chloride. These may be alike or different depending upon the solubilizing chloride or chlorides used in the original catalyst recipe and the hydroxide employed in the digestion step. In any event, the total quantity of solubilizing chloride or the ratios among the solubilizing chlorides present must usually be adjusted by addition of a chloride chosen from the group consisting of the alkali metal chlorides, the alkaline earth metal chlorides, and ammonium chloride. The solubilizing chloride salt may be added as a solid or as an aqueous solution of slurry either prior to or following the neutralization. Preferably, it is added just prior to the addition of hydrochloric acid because it thus effects removal of some of the heat generated in the conversion of copper hydroxide to copper chloride. The amount required is determined by calculation based on an analysis of the chloride present in the neutralized mixture. Generally, when the used catalyst contains both sodium and potassium chlorides and sodium hydroxide is used in the digestion step, enough potassium chloride is added to the copper chloride to establish a KCl/NaCl ratio of approximately 3:1 in the regenerated catalyst.

Occasionally, the problem of foaming is encountered in the various steps of the regeneration process described and particularly in the centrifuging step. It may be obviated when it occurs by the use of certain recognized antifoam agents.

The regenerated catalyst slurry containing copper chloride, water, and solubilizing chloride or chlorides may be used as such if it is added to the catalyst solution in an operating reactor since the required amount of water to effect solution will be stripped from it in the course of the reaction. Otherwise, if the regenerated catalyst is to be employed as such or added to fresh or partially used catalyst, it is advantageously employed as a solution. The solids in the mixture can be readily put into solution by simply evaporating water from the mixture until a homogeneous liquid is obtained.

What is claimed is:

1. A process for regenerating a spent acrylonitrile synthesis aqueous catalyst containing cuprous chloride, solubilizing chlorides chosen from the group consisting of the alkali metal, alkaline earth metal and ammonium chlorides, and carbon-containing impurities which comprises precipitating the copper present therein as cuprous hydroxide by digesting said catalyst in a solution of a hydroxide chosen from the group consisting of the alkali metal and the alkaline earth metal hydroxides at a temperature in the range from about 70 to 90° C. for a period from about 1 to about 6 hours, the amount of said hydroxide being sufficient to provide a molar excess of 10 to 25% over that required to react with the cuprous chloride, the ammonium chloride, and the carbon-containing impurities present in said catalyst, said hydroxide solution having a concentration such that the solids content of the mixture resulting from the digestion step is below 15%, separating the solid cuprous hydroxide formed from the liquor of the digestion mixture, converting said cuprous hydroxide to cuprous chloride by reaction with hydrochloric acid, and adding to the resulting cuprous chloride slurry a chloride chosen from the group consisting of the alkali metal, the alkaline earth metal and ammonium chlorides.

2. A process for regenerating a spent acrylonitrile synthesis aqueous catalyst containing cuprous chloride, solubilizing chlorides chosen from the group consisting of the alkali metal, alkaline earth metal and ammonium chlorides, and carbon-containing impurities which comprises adding said catalyst to a solution of hydroxide chosen from the group consisting of the alkali metal and the alkaline earth metal hydroxides, the amount of said hydroxide being sufficient to provide a molar excess of 10 to 25% over that required to react with the cuprous chloride, the ammonium chloride, and the carbon-containing impurities present in said catalyst, said hydroxide solution having a concentration such that the solids content of the mixture resulting from the digestion step is below 15%, digesting said catalyst in said hydroxide for a period of about 1 to about 6 hours at a temperature in the range from about 70 to about 90° C., separating the solid cuprous hydroxide formed from the liquor of the digestion mixture as a slurry, converting said cuprous hydroxide to cuprous chloride by adding hydrochloric acid to said slurry until the pH of the slurry lies in the range from 1 to 3, and adding to the resulting cuprous chloride slurry a chloride chosen from the group consisting of the alkali metal, the alkaline earth metal and ammonium chlorides.

3. A process for regenerating a spent acrylonitrile synthesis aqueous catalyst containing cuprous chloride, solubilizing chlorides chosen from the group consisting of the alkali metal, alkaline earth metal and ammonium chlorides and carbon-containing impurities which comprises adding said catalyst to a solution of a hydroxide chosen from the group consisting of the alkali metal and the alkaline earth metal hydroxides, the amount of said hydroxide being sufficient to provide a molar excess of 10 to 25% over that required to react with the cuprous chloride, the ammonium chloride, and the carbon-containing impurities present in said catalyst, said hydroxide solution having a concentration such that the solids content of the mixture resulting from the digestion step is below 15%, digesting said catalyst in said hydroxide for a period of about 1 to about 6 hours at a temperature in the range from about 70 to about 90° C., separating the solid cuprous hydroxide formed from the liquor of the digestion mixture as a slurry, converting said cuprous hydroxide to cuprous chloride by adding hydrochloric acid to said slurry until the pH of the slurry lies in the range from 1 to 3, and adding to the resulting cuprous chloride slurry a chloride chosen from the group consisting of the alkali metal, the alkaline earth metal and ammonium chlorides, and evaporating water from said slurry until the slurry is converted into a solution.

4. The process of claim 3 wherein all steps in the method are conducted under an inert atmosphere.

5. A process for regenerating a spent acrylonitrile synthesis aqueous catalyst containing cuprous chloride, solubilizing chlorides chosen from the group consisting of the alkali metal, alkaline earth metal and ammonium chlorides, and carbon-containing impurities which comprises precipitating the copper present therein as cuprous hydroxide by digesting said catalyst in a solution of sodium hydroxide at a temperature in the range from about 70 to 90° C. for a period from about 1 to about 6 hours, the amount of said hydroxide being sufficient to provide a molar excess of 10 to 25% over that required to react with the cuprous chloride, the ammonium chloride, and the carbon-containing impurities present in said catalyst, said hydroxide solution having a concentration such that the solids content of the mixture resulting from the digestion step is below 15%, separating the solid cuprous hydroxide formed from the liquor of the digestion mixture, converting said cuprous hydroxide to cuprous chloride by reaction with hydrochloric acid, and adding potassium chloride to the resulting cuprous chloride slurry.

6. The process of claim 5 wherein all the steps are carried out under an inert atmosphere.

7. A process for regenerating a spent acrylonitrile synthesis aqueous catalyst containing cuprous chloride, solubilizing chlorides chosen from the group consisting of the alkali metal, alkaline earth metal and ammonium chlorides, and carbon-containing impurities which comprises adding said catalyst to a solution of sodium hydroxide, the amount of said hydroxide being sufficient to provide a molar excess of 10 to 25% over that required to react with the cuprous chloride, the ammonium chloride, and the carbon-containing impurities present in said catalyst, said hydroxide solution having a concentration such that the solids content of the mixture resulting from the digestion step is below 15%, digesting said catalyst in said hydroxide for a period of from about 1 to about 6 hours at a temperature in the range from about 70 to about 90° C., separating the solid cuprous hydroxide formed from the liquor of the digestion mixture as a slurry, converting said cuprous hydroxide to cuprous chloride by adding hydrochloric acid to said slurry until the pH of the slurry lies in the range from 1 to 3, and adding potassium chloride to the resulting cuprous chloride slurry.

8. A process for regenerating a spent acrylonitrile synthesis aqueous catalyst containing cuprous chloride, solubilizing chlorides chosen from the group consisting of the alkali metal, alkaline earth metal and ammonium chlorides, and carbon-containing impurities which comprises adding said catalyst to a solution of sodium hydroxide, the amount of said hydroxide being sufficient to provide a molar excess of 10 to 25% over that required to react with the cuprous chloride, the ammonium chloride, and the carbon-containing impurities present in said catalyst, said hydroxide solution having a concentration such that the solids content of the mixture resulting from the digestion step is below 15%, digesting said catalyst in said hydroxide for a period of from about 1 to about 6 hours at a temperature in the range from about 70 to about 90° C., separating the solid cuprous hydroxide formed from the liquor of the digestion mixture as a slurry, converting said cuprous hydroxide to cuprous chloride by adding hydrochloric acid to said slurry until the pH of the slurry lies in the range from 1 to 3, adding potassium chloride to the resulting cuprous chloride slurry in an amount such that the ratio of potassium chloride to sodium chloride in the resulting slurry is approximately 3 to 1, and evaporating water from said slurry until the slurry is converted into a solution.

References Cited in the file of this patent

UNITED STATES PATENTS

| | | |
|---|---|---|
| 1,867,357 | Furness | July 12, 1932 |
| 2,586,579 | Supiro | Feb. 19, 1952 |
| 2,748,157 | Taylor | May 29, 1956 |
| 2,840,592 | Carpenter | June 24, 1958 |